United States Patent [19]

Bergmann et al.

[11] Patent Number: 4,630,114
[45] Date of Patent: Dec. 16, 1986

[54] METHOD FOR DETERMINING THE DISPLACEMENT OF MOVING OBJECTS IN IMAGE SEQUENCES AND ARRANGEMENT AS WELL AS USES FOR IMPLEMENTING THE METHOD

[75] Inventors: Hans C. Bergmann, Neu-Isenburg; Hans-Georg Musmann, Salzgitter-Bad, both of Fed. Rep. of Germany

[73] Assignee: ANT Nachrichtentechnik GmbH, Backnang, Fed. Rep. of Germany

[21] Appl. No.: 708,457

[22] Filed: Mar. 5, 1985

[30] Foreign Application Priority Data

Mar. 5, 1984 [DE] Fed. Rep. of Germany ....... 3408016

[51] Int. Cl.$^4$ .................................... H04N 7/137
[52] U.S. Cl. ..................... 358/136; 358/36; 358/105; 358/166; 375/27
[58] Field of Search ............... 358/21 R, 36, 37, 105, 358/136, 160, 166, 167; 375/27

[56] References Cited

U.S. PATENT DOCUMENTS

| | | | |
|---|---|---|---|
| 3,890,462 | 6/1975 | Limb et al. | 358/105 |
| 4,007,485 | 2/1977 | Sato | 358/36 |
| 4,193,092 | 3/1980 | Stoffel | 358/136 |
| 4,246,610 | 1/1981 | Takahashi | 358/36 |
| 4,383,272 | 5/1983 | Netravali et al. | 358/136 |
| 4,437,161 | 3/1984 | Anderson | 358/105 |

OTHER PUBLICATIONS

Bergmann, "Analysis of Different Estimation Algorithms for Digital Television Signals", NATO ASI Series, vol. F2, Image Sequence Processing and Dynamic Scene Analysis, T. S. Huang, Springer Verlag, 1983, pp. 215-234.

Schalkoff, "IEEE Trans. on Pattern Analysis and Machine Intelligence", vol. 4, No. 1, Jan. 1982, pp. 2-10.

Bergmann, "Displacement Estimation Based on the Correlation of Image Segments", International Conference on Elec. Image Processing, Jul. 1982, Univ. of York, Great Britain.

Cafforio et al, "IEEE Transaction Information Theory", vol. IT-22, No. 5, Sep. 1976, pp. 573-579.

Primary Examiner—Howard W. Britton
Assistant Examiner—Cynthia Smith
Attorney, Agent, or Firm—Spencer & Frank

[57] ABSTRACT

In a method and apparatus for determining, in a system having a transmitting end and a receiving end, displacements of image features occurring between successively transmitted image sequences, by the operations of: determining, at the receiving end, peak values of pixel correlation between successively transmitted image sequences; deriving representations of estimated displacement values from the peak values of pixel correlation; and producing representations of optimized displacement values by a recursion operation which includes recursively deriving a correction value and adding the correction value to an existing estimated displacement value to form a new estimated value, the correction value is derived by performing a mathematical division operation in which the dividend is a selected function of pixel values in successive image sequences and the divisor is proportional to the average of a first value resulting from crosscorrelation of successively transmitted image sequences and a second value resulting from autocorrelation of the currently received image sequence.

5 Claims, 4 Drawing Figures

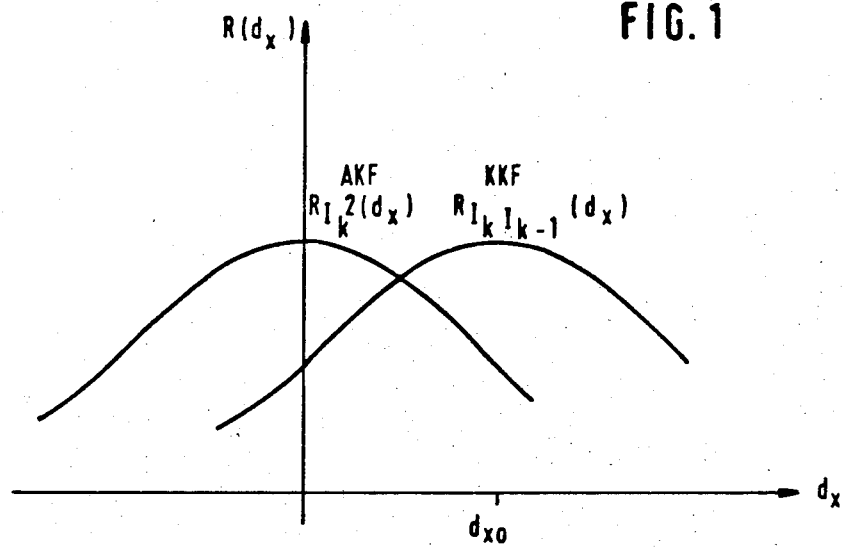
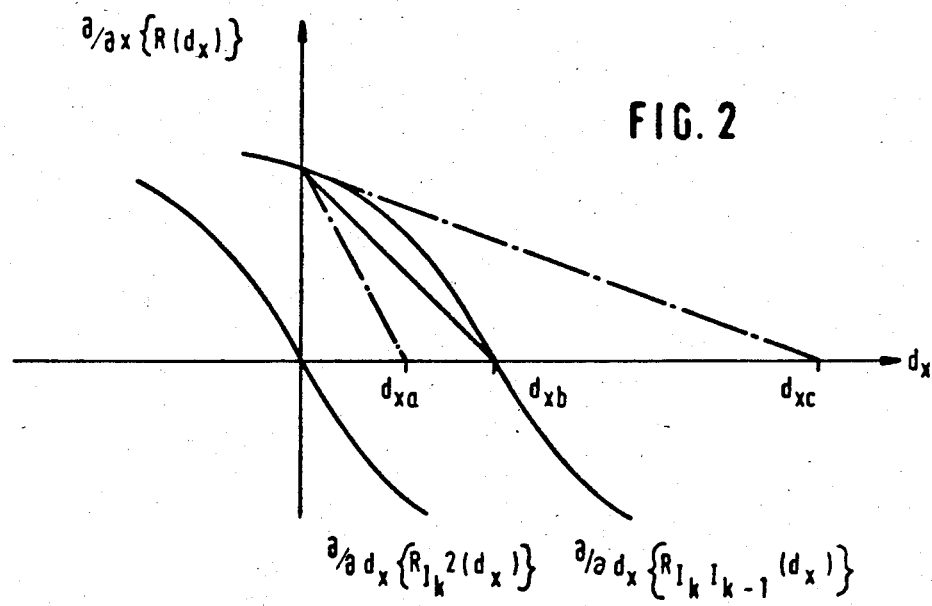

METHOD FOR DETERMINING THE DISPLACEMENT OF MOVING OBJECTS IN IMAGE SEQUENCES AND ARRANGEMENT AS WELL AS USES FOR IMPLEMENTING THE METHOD

BACKGROUND OF THE INVENTION

The present invention relates to a method and circuit arrangement for determining displacements of scene elements between successively transmitted image sequences corresponding to a field or frame. Such scene elements are associated with moving objects appearing in the scene depicted by the image sequences. Such a method is described by Hans C. Bergmann in an article entitled "Analysis of Different Displacement Estimation Algorithms for Digital Television Signals," published in NATO ASI Series, Vol. F2, *Image Sequence Processing and Dynamic Scene Analysis*, edited by T. S. Huang, published by Springer Verlag, Berlin, Heidelberg, 1983, at pages 215-234.

Various recursive and nonrecursive estimating methods have been published for determination of displacement in television signals under real-time conditions.

Nonrecursive methods are disclosed, for example, by Schalkoff in "IEEE Trans. on Pattern Analysis and Machine Intelligence," Vol. 4, No. 1, January, 1982, at pages 2-10. They have the advantage that hardware implementation thereof is relatively easy but they operate with sufficient accuracy in their estimation only for displacements of up to 2 pixels per frame. See, in this connection, Bergmann, supra, page 222. Since displacements of more than 10 pixels per frame occur in natural television image sequences, these methods find only limited use.

Recursive estimating methods are generally based on an optimization criterion, with a correction value being added to the respectively preceding estimated value so that the optimization value gradually approaches the optimum value. Examination of known recursive displacement estimation methods has shown that they converge at sufficient speed, i.e. already after a few recursion steps, for average displacements up to about 4 pixels per frame. However, for large displacements up to 20 pixels per frame, five and more recursion steps are required to overcome the transient state.

However, with respect to real-time estimation, the number of recursion steps is limited to one or two steps so that these methods likewise find only limited use for the estimation of large displacements.

SUMMARY OF THE INVENTION

It is therefore an object of the present invention to determine displacement in successively transmitted image sequences so as to furnish an accurate estimated value already after a few recursion steps, i.e. to achieve a very high convergence rate, with the prerequisite that the convergence range is at least as large as in the known methods.

The above and other objects are achieved, according to the invention, in connection with a method for determining, in a system having a transmitting end and a receiving end, displacements of image features occurring between successively transmitted image sequences, which method includes: determining, at the receiving end, peak values of pixel correlation between successively transmitted image sequences; deriving representations of estimated displacement values from the peak values of pixel correlation; and producing representations of optimized displacement values by a recursion operation which includes recursively deriving a correction value and adding the correction value to an existing estimated displacement value to form a new estimated value. According to the invention, the step of deriving a correction value comprises performing a mathematical division operation in which the dividend is a selected function of pixel values in successive image sequences and the divisor is proportional to the average of a first value resulting from crosscorrelation of successively transmitted image sequences and a second value resulting from autocorrelation of the currently received image sequence.

The objects of the invention are further achieved by apparatus for determining, in a system having a transmitting end and a receiving end, displacements of scene features occurring between successively transmitted image sequences, the apparatus comprising:

a first input point connected to receive a signal representing the image sequence currently being transmitted;

a second input point connected to receive a signal representing a previously transmitted image sequence;

first and second differentiating means each having an input connected to a respective one of the input points and each constituting means for producing an output signal representing the derivative of the signal at its input;

first subtraction means having two inputs each connected to a respective one of the first and second input points and an output for providing a difference signal having a value equal to the difference between the values of the signals at the first and second input points;

adder means having two inputs each connected to receive the output signal produced by a respective one of the differentiating means, and an output for providing a sum signal having a value equal to the sum of the values of the signals produced by the first and second differentiating means;

first and second multiplying means each having first and second inputs and an accumulating output device for storing a representation of the accumulated products of the signal values supplied to the first and second inputs over a selected window w of neighbouring pixels, the first input of the first multiplying means and the second input of the second multiplying means being connected to receive the output signal produced by the first differentiating means, the second input of the first multiplying means being connected to the output of the first subtraction means, and the first input of the second multiplying means being connected to the output of the adder means;

dividing means having two inputs each connected to receive the representation stored in the accumulating output device of a respective one of the multiplying means, and an output providing a representation of the quotient of the representations received by the dividing means inputs;

second subtraction means having a subtrahend input connected to the output of the dividing means, a minuend input and an output providing a representation of the difference between the representations at its minuend and subtrahend inputs; and memory means having an input connected to receive the representation presently provided at the output of the second subtraction means, storage means for storing the representation provided at the output of the second subtraction means for the next iteration, and an output connected to the minuend input of the second subtraction means for supplying the representation stored by the storage means;

whereby the output of the second subtraction means provides a recursively optimized representation of the displacements of image features occurring between successively transmitted image sequences.

A particular advantage of the present invention is its better and faster convergence rate of the estimated value for the displacement compared to those methods which use either only crosscorrelation or autocorrelation functions for the divisor. Because of the fast convergence rate, the method is particularly suitable for real-time estimation.

The present invention will now be described in greater detail with reference to the drawings.

BRIEF DESCRIPTION OF THE DRAWINGS

FIG. 1 is a diagram showing one-dimensional autocorrelation and crosscorrelation functions of the luminance signals of two successive image sequences corresponding either to fields or frames.

FIG. 2 is a diagram showing the first derivative of the correlation functions and the estimated displacement values.

DESCRIPTION OF THE PREFERRED EMBODIMENTS

Figure 3:
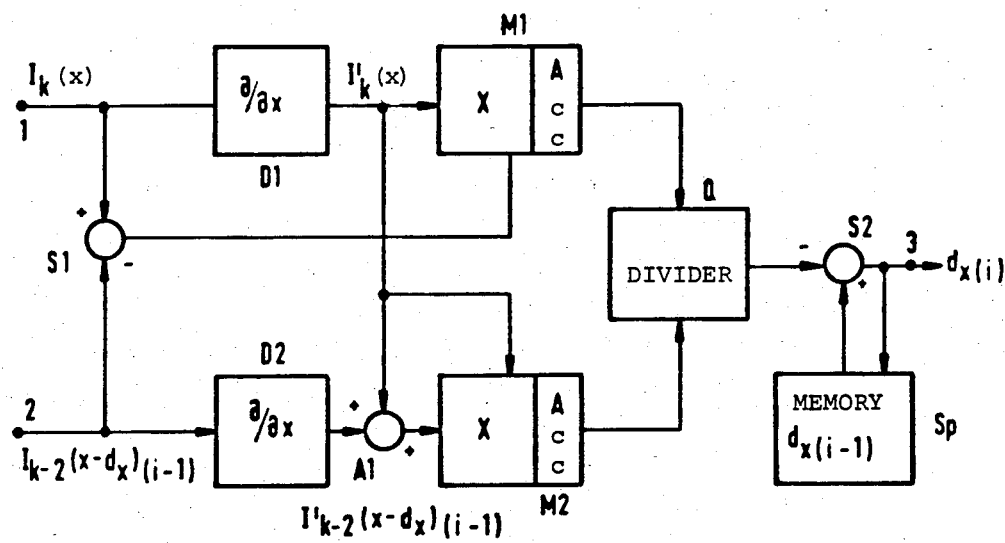
FIG. 3 is a block circuit diagram of a preferred embodiment of an arrangement for implementing the method of the present invention.

Some basics and prerequisites for better understanding of the relationships given below shall be explained first. A moving object in a televised scene is being observed. The two-dimensional luminance signal of the image sequence just being transmitted is designated $I_k(x,y)$ and the image sequence transmitted immediately preceding in time is designated $I_{k-1}(x,y)$. Thus, x and y are the horizontal and vertical coordinates of each picture element of an image sequence and k is a parameter for the succession of image sequences. For example, each image sequence can be a television picture field. Correlation R of these two signals, in dependence on the displacements $d_x$ and $d_y$, which are the localized signal offset between these two image sequences in the x and y directions, then provides $$R_{I_k I_{k-1}}(d_x, d_y) = \int\int_{-\infty}^{+\infty}\int_{-\infty}^{+\infty} I_k(x,y) \cdot I_{k-1}(x - d_x, y - d_y) dx\, dy \quad (1)$$

with a correlation peak at $d_x, d_y$.

Through use of the recursion formulas:

$$d_{x(i)} = d_{x(i-1)} + d_x \quad (2)$$

$$d_{y(i)} = d_{y(i-1)} + d_y \quad (3)$$

displacement can be determined in the $i^{th}$ iteration step, whereby the iterations can be carried out either at one pixel or from one to the next pixel spatially as well as temporarily.

Displacement in the horizontal direction, the x direction, can be expressed by means of the following equation:

$$d_x = \frac{R_{I_{k-1}I'_{k-1}}(0,0) + R_{I'_k I_{k-1}}(d_x,d_y)_{(i-1)} - R_{I_k I'_{k-1}}(d_x,d_y)_{(i-1)} - R_{I_k I'_k}(0,0)}{R_{I'_k I'_k}(0,0) + R_{I'_k I'_{k-1}}(d_x,d_y)_{(i-1)}} \quad (4)$$

wherein I' represents the partial derivative $\partial/\partial_x I$, and (0,0) signifies that for the respective correlation there is no relative displacement associated with the two signals being correlated because they relate to the same image sequence. In the denominator of this term, there appear only the sum of the first derivative of the autocorrelation function for $I_k$ at point (0,0) and the first derivative of the crosscorrelation function of $I_k$ and $I_{k-1}$ at point $(d_x, d_y)$, i.e. the point where the autocorrelation function (AKF) and the crosscorrelation function (KKF) have their peak values. FIG. 1 shows these autocorrelation and crosscorrelation functions for the displaced luminance signals with respect to a one-dimensional example. The peak value of AKF, $R_{I_k}{}^2 (d_x)$, lies at $d_x=0$ and the peak value of KKF, $R_{I_k I_{k-1}}(d_x)$, lies at $d_x=d_{x0}$. For stationary portions of a scene depicted by successive image sequences, the following then applies:

$$R_{I_{k-1}I'_{k-1}}(0,0) = R_{I_k I'_k}(0,0). \quad (5)$$

Moreover, the order of differentiation and integration can be exchanged for stationary processes of $I'_k$ and $I_{k-1}$. By way of conversions, the following results:

$$R_{I'_k I_{k-1}}(d_x,d_y) = \partial/\partial d_x R_{I_k I_{k-1}}(d_x,d_y) \quad (6)$$

$$R_{I_k I'_{k-1}}(d_x,d_y) = -\partial/\partial d_x R_{I_k I_{k-1}}(d_x,d_y) \quad (7)$$

$$R_{I'_k I'_{k-1}}(d_x,d_y) = -\partial^2/\partial d_x^2 R_{I_k I_{k-1}}(d_x,d_y) \quad (8)$$

and thus for Equation (4)

$$d_x = -\frac{2\,\partial/\partial d_x R_{I_k I_{k-1}}(d_x,d_y)_{(i-1)}}{\partial^2/\partial d_x^2 \{R_{I_k I_k}(0,0) + R_{I_k I_{k-1}}(d_x,d_y)_{(i-1)}\}} \quad (9)$$

In this case, Equation (9) is used to locally determine the maximum of the crosscorrelation function of the displaced video signals $I_{k-1}(x,y)$ and $I_k(x,y)$. FIG. 2, in conjunction with FIG. 1, shows these relationships again for one-dimensional functions.

In FIG. 1, the autocorrelation function (AKF) $R_{I_k I_k}$ $(d_x)$ and the crosscorrelation function (KKF) $R_{I_k I_{k-1}}$ $(d_x)$ of the video signals approximately coincide in their shapes and are displaced with respect to one another in direction $d_x$ by the distance $d_{x0}$. Let it be assumed that the starting value for the recursive estimation method is $d_{x(i-1)}=0$. The first estimated value $d_{xb}$ is calculated according to Equation (9) from the quotient of the first derivative of KKF at point (0,0) and the second derivatives of AKF and KKF, each weighted with the factor ½. By averaging both second derivatives in Equation (9), the estimated value approximates the actual displacement $d_{x0}$ better than the known methods in which the divisor contains either only the second derivative of KKF or of AKF. In these cases, one obtains the estimated values $d_{xa}$ and $d_{xc}$, respectively, which are shown in dot-dash lines in FIG. 2.

In a comparison with known methods for determining displacement, it was found for the example of a special KKF that the novel displacement estimating method converges faster by a factor of 4 than the Newton method described by Bergmann in "Displacement Estimation Based On The Correlation Of Image Segments", published by the International Conference on Electronic Image Processing, July, 1982, University of York, Great Britain and faster by a factor of 2 than a method described by Cafforio and Rocca in an article published in IEEE Transact. on Information Theory, Vol. IT-22, No. 5, September, 1976, pages 573-579. Experimental examinations have further shown that the novel estimation method attains an accuracy sufficient for the interpolation of television image sequences already after two recursion steps.

The block circuit diagram according to FIG. 3 shows an arrangement for implementing the method according to the present invention. Realization of the method was based on the following relationship for displacement determination:

$$d_{x(i)} = d_{x(i-1)} - 2 \frac{\sum_w [I_{k-2}(x - d_x, y - d_y)_{(i-1)} - I_k(x,y)] \cdot \partial/\partial x\, I_k(x,y)}{\sum_w [\partial/\partial x\, I_{k-2}(x - d_x, y - d_y)_{(i-1)} + \partial/\partial x\, I_k(x,y)] \partial/\partial x\, I_k(x,y)} \quad (10)$$

where $I_k$ and $I_{k-2}$ are the luminances of respective video fields. Displacement $d_y$ for the vertical direction is determined correspondingly.

This relationship (10) is a modified form of Equation (9). It should be noted that in Equation (9), it is not the field $I_{k-1}(x,y)$ immediately prior to field $I_{k(x,y)}$ that is utilized for forming the cross correlation with $I_{k(x,y)}$, but the corresponding field $I_{k-2}(x,y)$ transmitted immediately prior to $I_{k-1}(x,y)$. Equation (10) is a recursive formula with which a new estimated value $d_{x(i)}$ is always formed from the estimated value $d_{x(i-1)}$ determined immediately before and a correction value $d_x$. In the first step, $d_{x(i)}$ is determined with $d_{x(i-1)}=0$ and in the second step $d_{x(i+1)}$ is determined with $d_{x(i)}$ from the first step, etc. In equation (10) the estimated values $d_{x(i-1)}$ and $d_{y(i-1)}$ determined in preceding iteration are used to calculate $I_{k-2}(x-d_x, y-d_y)_{(i-1)}$.

As can be seen in FIG. 3, the difference between image sequences $I_k(x)$ and $I_{k-2}(x-d_x)_{(i-1)}$ fed to signal inputs 1 and 2 is formed in subtracter S1. The two image sequences $I_k(x)$ and $I_{k-2}(x-d_x)_{(i-1)}$ are also conducted through respective differentiators D1 and D2 so that the first derivatives of the image sequences are available at their outputs. Multipliers M1 and M2 are additionally equipped with respective accumulation devices Acc with which the multiplied signals are summed—in the illustrated embodiment this summing is done with respect to an image window w (see Equation 10).

Window w is preferabby chosen rectangular. For instance the window size can be 5×5 pixels. With a sampling frequency of 10 MHz for the image sequences the time for multiplication will take 1,125 μs. That will mean, that in a time interval of 1,2–1,3 μs, i.e. for each 12th to 13th pixel, a displacement vector will be determined. Multipliers as well as differentiators realized in the form of subtractors for these purposes are well known, e.g. the 16 bit multiplier by TRW.

For multiplier M1, the signal fed to the first multiplier input is the output signal of differentiator D1 and the signal fed to the second multiplier input is the output signal of subtracter S1. Multiplier M2 receives the output signal of differentiator D1 as well as the output signal of an adder A1 which links the output signals of the two differentiators D1 and D2.

The output signals of M1 and M2 are supplied to respective inputs of a divider Q. The result of the division is weighted with a factor of 2. The actual estimated value $d_{x(i)}$ is obtained by means of a subtracter S2 by linking the estimated value determined during the last recursion step, which is stored in a memory Sp, and the correction value, i.e. the output signal of divider Q. For storing the previously determined estimated value, memory Sp is provided with a connection to output 3 of subtracter S2 which simultaneously constitutes the output of the arrangement. To take care that signals $I_k(x)$ and $I_{k-2}(x-d_x)_{(i-1)}$ can be evaluated together, a signal delaying device (not shown) is connected ahead of the arrangement to delay the luminance signal $I_k(x)$ for the duration of two fields or one frame.

The method according to the present invention can advantageously be used particularly for motion adaptive interpolation of video image sequences, e.g. for the reconstruction of eliminated image sequences (fields) in transmission channels employing data reduction. The principle involved is based on the reduction of the image repetition rate at the transmitting end by omitting video fields and motion adaptive interpolation of the not transmitted images in the receiver. A further advantageous use for the method according to the invention is the removal of flicker in standard television reception. The image repetition rate of the standard video signal on the monitor can be increased in that an additional image sequence is obtained by interpolation from two successively transmitted image sequences (fields), with the additional sequence being inserted at a monitor M between two conventionally displayed fields and the interpolated field being corrected in a motion adaptive manner under consideration of displacement. The differentiators D1 and D2 are realized in form of subtractors, i.e. spatial derivatives are substituted by spatial differentials.

Figure 4:
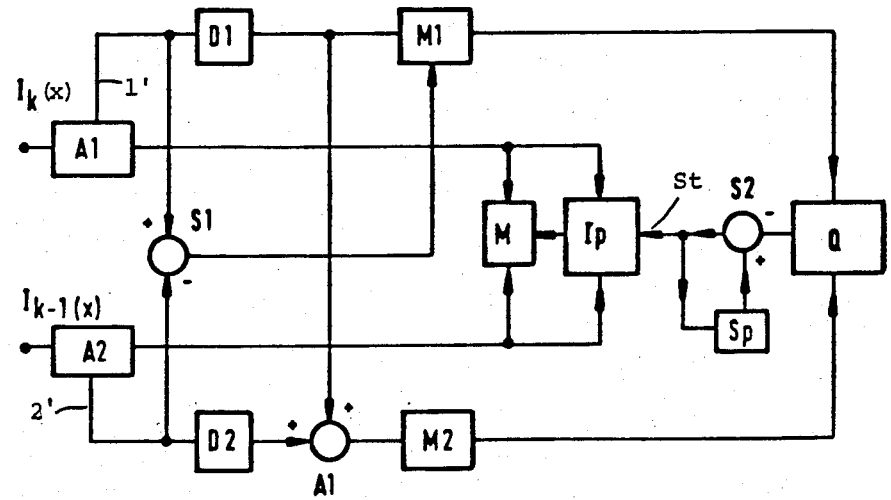
FIG. 4 is a block circuit diagram of an embodiment of a circuit according to the invention for reducing the image flicker in standard television.

The block circuit diagram of FIG. 4 shows an arrangement for such flicker removal. By means of an evaluation device, or image memory, A1 for a first image sequence (for example, the first field) and an evaluation device, or image memory, A2 for a second image sequence (for example, the field preceding the first field), an intermediate image sequence is produced in an interpolator Ip. This interpolator Ip has a control input St to which is fed a motion adaptive control signal. The displacement, as obtained with the arrangement according to FIG. 3, serves as the motion adaptive control signal.

Output 1' of evaluation device A1 corresponds to signal input 1 of FIG. 3. The same applies for output 2' of evaluation device A2. For the further components, such as adder, differentiators, multipliers, etc., the reference characters of FIG. 3 are also used in FIG. 4. Thus an interpolated intermediate image composed under consideration of displacement appears additionally on monitor M. Due to the transmission of the intermediate image, the observer is offered a higher image repetition rate which noticeably reduces image flicker, particularly for the playback of high luminance values. Visible distortions, e.g. along the edges of moving image portions, which would occur if displacement were not considered, are reduced. In order for the images to be displayed on monitor M in their correct time sequence, suitable delaying devices are required from case to case ahead of the inputs of Monitor M.

The method according to the present invention is particularly suitable for use in connection with source coding methods for the purpose of data reduction, as for example in DPCM image transmission, and for use in connection with noise suppression by means of image-to-image filters.

The interpolator $I_p$ is described in greater detail in our corresponding U.S. Application entitled Motion Adaptive Interpolation Of Television Image Sequences Ser. No. 708458 and claiming priority rights of Federal Republic of Germany Application No. 34 08 061.9 of Mar. 5, 1984. The input 2 of the circuit of FIG. 4 corresponds to the input 2 of FIG. 3. In FIG. 4 only one step of iteration is assumed.

It will be understood that the above description of the present invention is susceptible to various modifications, changes and adaptations, and the same are intended to be comprehended within the meaning and range of equivalents of the appended claims.

What is claimed is:

1. In a method for determining, in a system having a transmitting end and a receiving end, displacements of image features occurring between successively transmitted image sequences, which method includes: determining, at the receiving end, peak values of pixel correlation between successively transmitted image sequences; deriving representations of estimated displacement values from the peak values of pixel correlation; and producing representations of optimized displacement values by a recursion operation which includes recursively deriving a correction value and adding the correction value to an existing estimated displacement value to form a new estimated value, the improvement wherein said step of deriving a correction value comprises performing a mathematical division operation in which the dividend is a selected function of pixel values in successive image sequences and the divisor is proportional to the average of a first value resulting from crosscorrelation of successively transmitted image sequences and a second value resulting from autocorrelation of the currently received image sequence.

2. The method as defined in claim 1, carried out for the motion adaptive interpolation of intermediate image sequences for the reconstruction, in dependence of displacement, of image sequences eliminated during transmission.

3. The method as defined in claim 1, carried out for the removal of flicker in standard television transmissions, wherein additional image sequences are generated for playback from the transmitted image sequences by interpolation and the interpolation takes place in dependence of displacement.

4. The method as defined in claim 1, carried out for the suppression of noise by means of image-to-image filtering.

5. Apparatus for determining, in a system having a transmitting end and a receiving end, displacements of scene features occurring between successively transmitted image sequences, said apparatus comprising:

a first input point connected to receive a signal representing the image sequence currently being transmitted;

a second input point connected to receive a signal representing a previously transmitted image sequence;

first and second differentiating means each having an input connected to a respective one of said input points and each constituting means for producing an output signal representing the derivative of the signal at its input;

first subtraction means having two inputs each connected to a respective one of said first and second input points and an output for providing a difference signal having a value equal to the difference between the values of the signals at said first and second input points;

adder means having two inputs each connected to receive the output signal produced by a respective one of said differentiating means, and an output for providing a sum signal having a value equal to the sum of the values of the signals produced by said first and second differentiating means;

first and second multiplying means each having first and second inputs and an accumulating output device for storing a representation of the accumulated products of the signal values supplied to said first and second inputs over a selected window w, said first input of said first multiplying means and said second input of said second multiplying means being connected to receive the output signal produced by said first differentiating means, said second input of said first multiplying means being connected to said output of said first subtraction means, and said first input of said second multiplying means being connected to said output of said adder means;

dividing means having two inputs each connected to receive the representation stored in said accumulating output device of a respective one of said multiplying means, and an output providing a representation of the quotient of the representations received by said dividing means inputs;

second subtraction means having a subtrahend input connected to said output of said dividing means, a minuend input and an output providing a representation of the difference between the representations at its minuend and subtrahend inputs; and memory means having an input connected to receive the representation presently provided at said output of said second subtraction means, storage means for storing the representation provided at said output of said second subtraction means for the next iteration, and an output connected to said minuend input of said second subtraction means for supplying the representation stored by said storage means;

whereby said output of said second subtraction means provides a recursively optimized representation of the displacements of image features occurring between successively transmitted image sequences.

* * * * *